United States Patent [19]
Griffing

[11] 3,728,464
[45] Apr. 17, 1973

[54] UNDERGROUND TRANSFORMER ENCLOSURE, AND METHOD OF INSTALLING THE SAME

[76] Inventor: Roy Griffing, 485 North State Highway, Lake Arrowhead, Calif. 92352

[22] Filed: Apr. 17, 1972

[21] Appl. No.: 244,463

[52] U.S. Cl. .................. 174/16 R, 52/20, 94/37, 336/59
[51] Int. Cl. .................. H01f 27/08, E02d 29/04
[58] Field of Search .................. 174/15 R, 16 R, 37, 174/38, 39; 52/20; 94/34, 37, 38; 336/59

[56] References Cited

UNITED STATES PATENTS

| | | | |
|---|---|---|---|
| 3,519,726 | 7/1970 | Ewing | 174/37 |
| 3,482,108 | 12/1969 | Steinmayer | 174/37 X |
| 3,420,943 | 1/1969 | Short | 174/16 R |
| 3,390,224 | 6/1968 | Wyatt | 174/37 |
| 3,319,202 | 5/1967 | Lockie | 174/37 X |
| 1,408,982 | 3/1922 | Calhoun | 94/34 |
| 3,672,103 | 6/1972 | Kost | 52/20 |
| 3,390,225 | 6/1968 | Couch et al. | 174/16 R X |

FOREIGN PATENTS OR APPLICATIONS 1,081,209 8/1967 Great Britain .................. 174/37

OTHER PUBLICATIONS

Stewart, W. A. Cooling of Distribution Transformers in Vented Underground Vaults, IEEE Trans. Vol. PAS-88, No. 6 June 1969

Primary Examiner—Bernard A. Gilheany
Assistant Examiner—A. T. Grimley
Attorney—Richard L. Gausewitz et al.

[57] ABSTRACT

The enclosure for buried transformers is formed of two separate fiberglass parts, namely a hole liner and a cover. The hole liner comprises two corresponding semicylindrical sections which are joined together and then mounted around the transformer, in vertical relationship. The cover comprises a top portion and a skirt portion, and includes depending conduits for convecting cooling air down to the bottom of the hole liner. The convected air then passes upwardly through a central opening in the top portion of the cover. In accordance with the method, earth is compacted around the hole liner, following which the cover is mounted in telescoped relationship around the upper region of the hole liner. The cover is supported on the compacted earth, not on the hole liner, which means that the cover position is readily adjusted in the event the grade changes.

24 Claims, 7 Drawing Figures

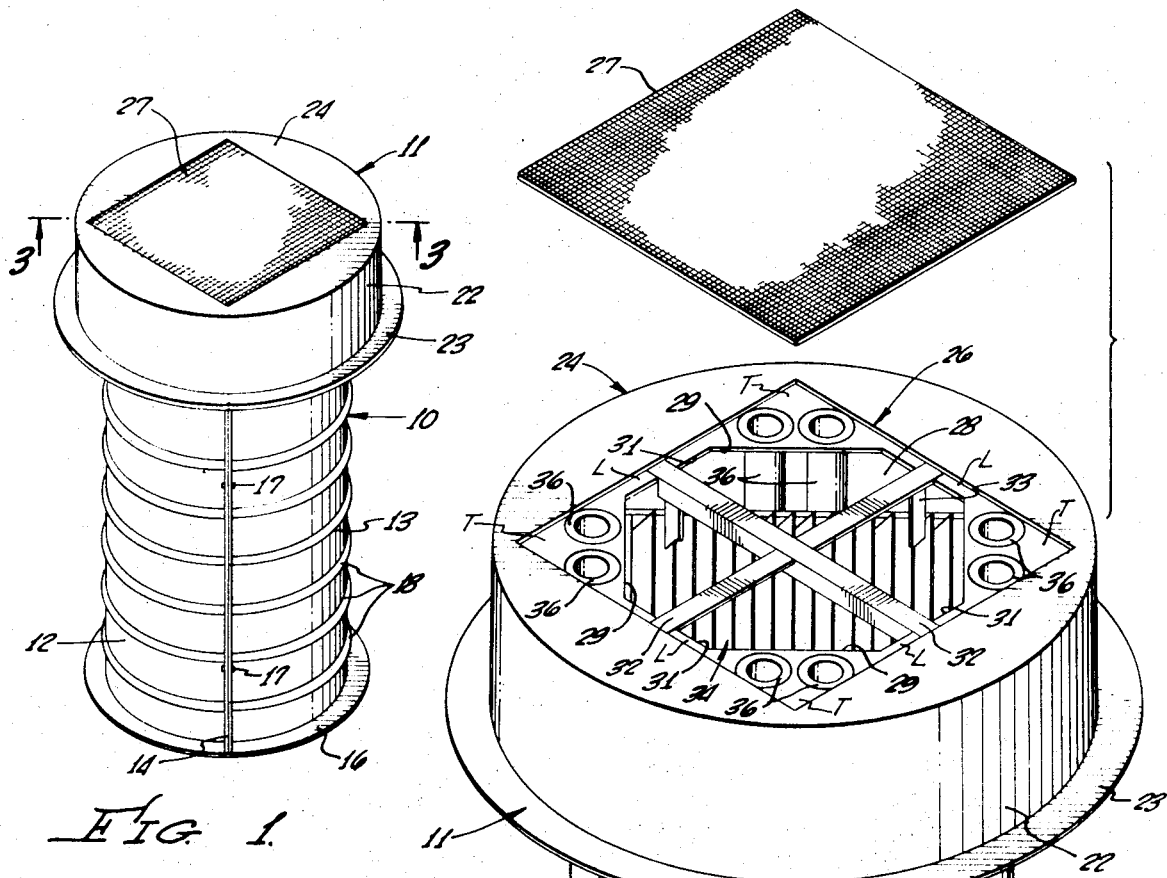
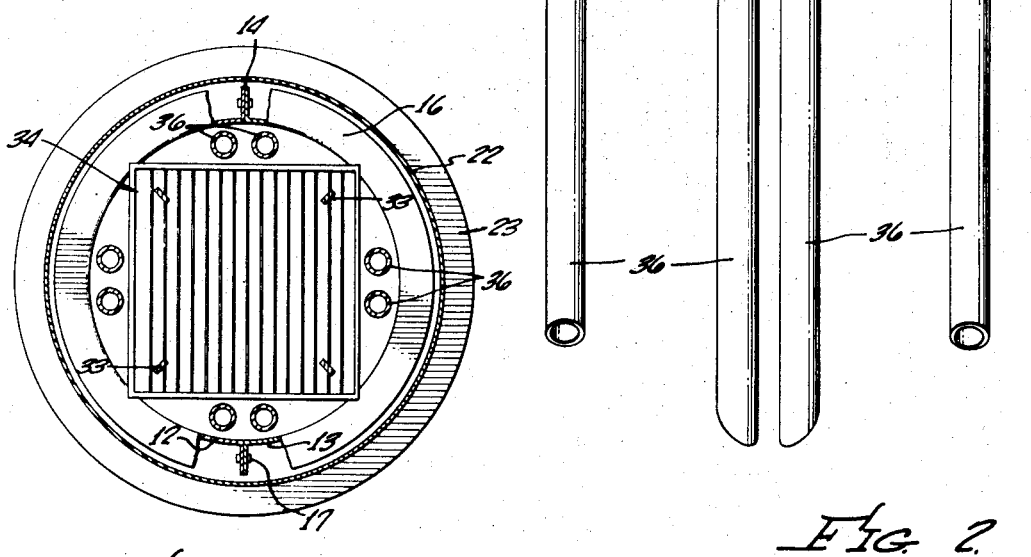
FIG. 1.  FIG. 2.  FIG. 4.

UNDERGROUND TRANSFORMER ENCLOSURE, AND METHOD OF INSTALLING THE SAME

BACKGROUND OF THE INVENTION

1. Field of the Invention

This invention relates to the field of of enclosures for underground utility equipment. More particularly, this invention relates to the field of enclosures for buried transformers forming parts of electrical utility systems.

2. Description of Prior Art

It is becoming increasingly common to lay underground the electric power lines leading to newly-built homes, etc. The transformers associated with such power lines are also placed underground, and it is customary practice to house such underground transformers in pre-cast concrete enclosures. These are very heavy and therefore difficult to transport and place. Furthermore, such concrete enclosures are bulky and awkward to store prior to use.

The exposed cover portions of conventional concrete enclosures for underground transformers rest on the hole-liner portions thereof. Therefore if the grade changes after the hole liner is placed in position, it is very difficult to orient properly the exposed cover to the new or changed grade. Another problem is that the heaviness of concrete hole liners causes them to sink and/or tip in the earth, particularly after protracted rains. When this occurs, the covers likewise sink and/or tip, which is highly undesirable.

Underground transformers require that a means be provided to convect air for cooling purposes. Conventionally, the convection inducing means is expensive, and/or does not induce air flow at regions below the upper end of the transformer. Therefore, cooling of the transformers has heretofore been inefficient and/or impractical.

SUMMARY OF THE INVENTION

In accordance with one aspect of the present invention, the cover of an underground transformer enclosure is not mounted on the hole liner, but is instead telescoped over the hole liner and supported on and in the surrounding earth. The relationship is caused to be such that the cover may be adjusted in position at any time and throughout a substantial range of adjustment, thereby facilitating adaptation of the enclosure to changes in the grade.

In accordance with a second aspect of the invention, the transformer is cooled convectively by air which passes downwardly through conduits depended from the cover. The conduits pass to the bottom portion of the enclosure, so that the air flow is operative to cool the full length of the transformer.

The cover comprises a removable air-transmissive grid which covers not only the upper ends of the conduits, but also a central opening in the cover. The cover and the hole liner are formed of light-weight fiberglass, instead of concrete. Furthermore, the hole liner is formed of corresponding halves which are readily manufactured, stored and shipped.

BRIEF DESCRIPTION OF THE DRAWINGS:

FIG. 1 is an isometric view of a transformer enclosure constructed in accordance with the present invention;

FIG. 2 is an enlarged exploded isometric view of the cover portion of the enclosure;

FIG. 4 is a horizontal section taken on line 4—4 of FIG. 3; and

DESCRIPTION OF THE PREFERRED EMBODIMENT

Figure 3:
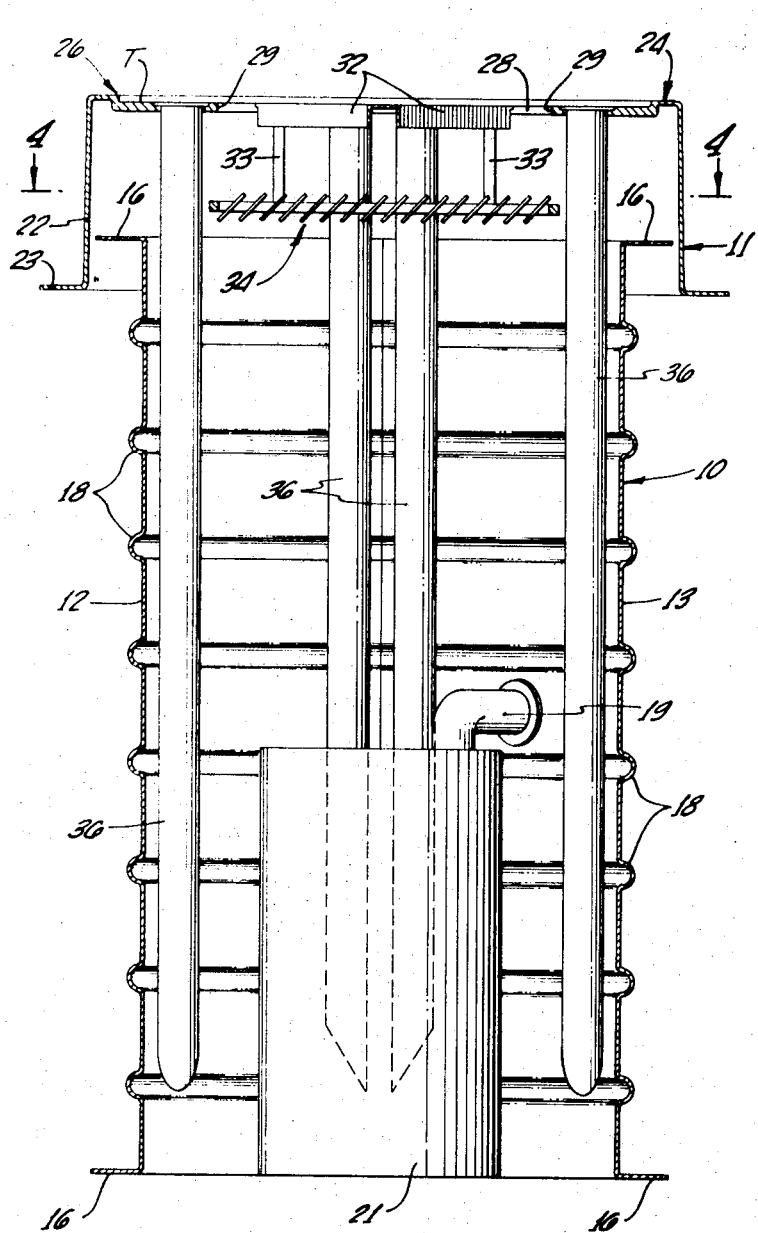
FIG. 3 is an enlarged vertical sectional view, taken on line 3—3 of FIG. 1.

Referring to the drawings, the enclosure for underground transformers is illustrated to comprise a hole liner 10 and a cover 11, each formed of glass fibers and synthetic bonding resin (for example, a polyester or epoxy). Hole liner 10 comprises two identical semicylindrical sections 12 and 13 (FIGS. 1 and 4) having outwardly-extending longitudinal flanges 14 at the side edges thereof and outwardly-extending arcuate flanges 16 at the end edges thereof.

Longitudinal flanges 14 are secured together by bolts 17, thus providing a continuous cylindrical hole liner having radially-outwardly extending circular flanges at the respective ends thereof. Such flanges formed by elements 16 are disposed in planes which are perpendicular to the longitudinal axis of the liner.

As best shown in FIG. 3, a plurality of longitudinally-spaced outwardly-extending circular ribs or beads 18 are provided integrally on the exterior of the hole liner, such ribs cooperating with the circular flanges in increasing the strength of the liner. The beads 18 are spaced apart sufficiently far to permit passage therebetween of the electrical conduit 19 which extends inwardly to the transformer, which is schematically represented at 21. It is pointed out that transformer 21 is mounted in vertical relationship, coaxially of the liner 10 and in the lower portion of the chamber defined within the liner.

Proceeding next to a description of the cover 11, this is indicated as being a generally cylindrical element although it may be of various other desired shapes, for example rectangular. Because the cover 11 is not mounted on the hole liner 10, but instead is supported on and in the earth as described hereinafter, a rectangular cover (for example) is readily employed even with a cylindrical hole liner 10.

The cover 11 has a skirt or side wall 22 which is (as above stated) generally cylindrical, being preferably slightly frustoconical in order to facilitate release from the mold in which it is made, and also to permit nesting when desired. The inner diameter of the skirt 22 is slightly larger (FIG. 3) than the outer diameter of the flange 16 at the upper end of the hole liner. The construction is therefore such that cover 11 may be disposed in various positions relative to the upper end of the hole liner, in telescoped relationship, the degree of telescoping being determined by factors described below.

At the lower edge of the side wall 22 is a radially-outwardly extending flange 23 which is disposed in a plane perpendicular to the axis of the cover, and which serves as a foot or bearing means to prevent undesired downward movement of the cover into the earth. Flange 23 also serves, when covered with earth or other fill material, as an anchor means preventing undesired upward movement of the cover.

The upper wall 24 of cover 11 is horizontal, being perpendicular to the axis of the cover and of the hole liner 10, and is integral with the skirt or side wall 22. As best shown in FIGS. 2 and 3, upper wall 24 has a square depressed portion 26 which is sufficiently depressed (indented below the upper surface of the surrounding portion of wall 24) that a square metal grid 27 may be mounted therein in substantially flush relationship to the upper surface of wall 24. Grid 27 is adapted to be secured to the remainder of the cover, by suitable screws (not shown).

The depressed portion 26 of wall 24 is partially cut out in order to form a large octagonal opening 28 (FIG. 2). Opening 28 is defined by four relatively long hypotenuse edges 29 which are so oriented that they form respectively, four right triangles T in the corner regions of the depressed portion 26. The remaining four edges 31 of the octagonal opening 28 are respectively parallel to and faced inwardly of the central regions of the sides of depressed portion 26, so that ledges L are formed.

First and second hanger supports 32 are disposed at right angles to each other across the opening 28 (FIG. 2), the protruding ends of the hanger supports being seated on the ledges L. Hangers 33 extend downwardly from the hanger supports 32 and support in horizontal relationship a rectangular louver assembly 34.

Louver 34 permits upward circulation of air from transformer 21 and through the opening 28 and grid 27 thereon. However, the louver cooperates with the grid in preventing downward passage of undesired objects to the vicinity of the transformer 21. For example, the louver assembly 34 prevents children from introducing wires, which could create a shock hazard, into the hole liner.

There will next be described the means for convecting cooling air to the bottom region of hole liner 10, in the space surrounding the transformer 21, so that a very efficient flow of cooling air is created over the transformer and up through the louver assembly 34 and the opening 28. Such cooling means comprises a plurality of elongated conduits 36 which are mounted in dependent relationship from the cover wall 24, and which extend into the annulus between transformer 21 and the lower portion of hole liner 10. The conduits 36 are preferably formed of plastic, or other electrical nonconductor, in order that there will be no shock hazard.

Eight such conduits 36 are illustrated, there being two mounted in dependent relationship from each triangular corner T of depressed portion 26. Mounting of the conduits is readily effected by providing radially-outwardly extending flanges at the upper ends thereof, which flanges seat in corresponding counterbores in corners T. The shank or body portions of the conduits extend downwardly through openings in the corners T. The lower ends of the conduits are preferably cut off in a beveled or inclined manner, as illustrated, in order to prevent them from being caught on the transformer 21 or on cable 19 during mounting of the cover.

It is pointed out that the upper ends of conduits 36 are covered by the grid 27, as is the opening 28. Thus, all portions of the convective circulation means are covered by the grid 27. Because the grid 27 is secured by screws to the remainder of the cover, the tubes are held in position (against upward movement) without the necessity of being adhesively secured to the cover.

DESCRIPTION OF THE METHOD

The first step in the method comprises excavating a hole which is substantially deeper than the length of hole liner 10, and which has a diameter substantially greater than that of the hole liner. Such hole is indicated at 41 in FIGS. 5–7. A layer of gravel 42 is placed at the bottom of the hole 41, to serve as a support for the transformer 21 and the hole liner 10, and to aid in the drainage of water which enters through opening 28. The gravel layer is made sufficiently thin that the upper end of liner 10 is spaced below grade level.

Figure 5:
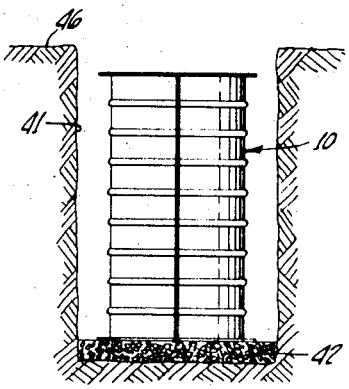
FIGS. 5–7 are elevational views illustrating the method of installation.

The liner 10 is then mounted in hole 41 in vertical relationship, this preferably occurring after the electrical conduit 19 (FIG. 3) is passed through the wall of the liner. Transformer 21 is mounted coaxially at the bottom of the liner 10, in supported relationship on gravel 42, and is connected to conduit 19. FIG. 5 illustrates the condition of the parts at this stage of the operation (the transformer 21 and its conduit 19 being in position as shown in FIG. 3).

Figure 6:
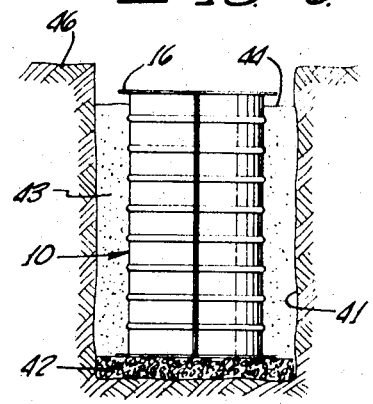
Figure 7:
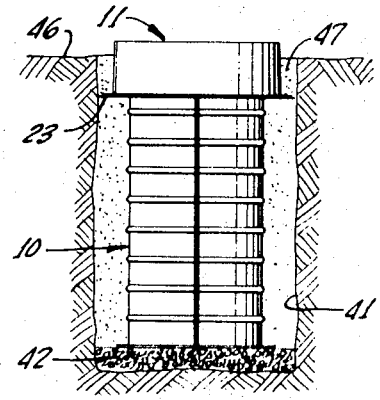

Referring next to FIG. 6, the next step in the method comprises backfilling earth 43 into the annulus or space which surrounds liner 10. Such earth is tamped and thus compacted in order to reduce settling to a minimum. The horizontal surface 44 of the backfilled earth 43 is caused to be spaced a substantial distance (defined below) below the flange 16 at the upper end of liner 10.

The next step in the method comprises mounting the cover 11 in telescoped relationship over the upper end of the liner, so that the flange or bearing element 23 at the lower edge of the cover is supported on upper surface 44 of earth 43. Such mounting of the cover 11 automatically effects introduction of conduits 36 into the lower portion of the liner 10, radially-outwardly from transformer 21.

The depth of the hole 41, and the thickness of the layer of gravel 42, are correlated to the length of liner 10 and also to the vertical dimension of cover skirt 22 in such manner that the upper wall 24 of the cover will be at the desired elevation (at or above grade level) when flange 23 and earth surface 44 are spaced a predetermined desired distance beneath upper flange 16 of the liner. Such "predetermined desired distance" is correlated to the grade level 46 (FIGS. 5-7), in such manner that subsequent changes in the elevation of the cover may be made in either direction — both upwardly and downwardly.

Flange 23 is thus initially spaced sufficiently below upper flange 16 that the cover may subsequently be raised substantially (to compensate for grade elevation) without causing flange 23 to be above flange 16 (which would make it possible for earth to pass into the hole liner). On the other hand, the degree of initial spacing of flange 23 below upper flange 16 is not sufficiently great that wall 24 is seated on or is located near the flange 16. Therefore, it is possible to effect substantial lowering of the cover when the grade lowers.

If the grade 46 becomes lower, so that it is desired to lower the cover, it is merely necessary to remove the cover, remove some of the earth 43 beneath the cover (thus lowering the upper surface 44 of the earth 43), and then replace the cover. Should the grade 46 become higher, the above-indicated procedure is followed except that earth is added to the earth 43 to thereby raise the upper surface 44. The cover 11 rests solely and directly on the earth, not on liner 10, at all times except in response to a rare occasion when the grade level becomes very much lower than it was when the enclosure was buried. The word "earth", as employed in the accompanying claims, denotes any desired fill material.

It is emphasized that, since the cover rests upon earth and not upon the hole liner 10, any tilting of the hole liner (for example, caused by soaking of water into the earth) will not affect the cover. Should any tilting of the cover occur, it is readily corrected in the manner indicated above, and without the necessity of touching the hole liner 10. It is noted, however, that because of the light-weight construction of both the hole liner and the cover, settling and tilting of the various components are maintained at a minimum.

As the final step in the method, additional earth (or other desired fill material) 47 is backfilled and compacted above the flange 23. The degree of filling is preferably such that the upper surface of the additional earth 47 is flush with grade 46. Because flange 23 serves as an anchor, the additional earth 47 holds the cover in position, However, the cover is readily removable if and when it is desired to change the elevation or inclination of the cover as described above.

Access may be had to transformer 21 without the necessity of removing the entire cover, this being effected by merely removing the grid 27 and then lifting on the hanger supports 32 to cause the louver element 34 to pass upwardly through opening 28.

It is to be understood that the various elements 11, 36, 33, 34, etc., may be preassembled a the factory. Alternatively, the covers 11 may be mounted in nested relationship, and the assembly thereof with elements 36, etc., may be readily effected at the job site. Similarly, the various halves 12 and 13 of the cylindrical hole liner 10 may be readily assembled at the job site by means of the bolts 17 (FIGS. 1 and 4).

Although the invention has been described in connection with transformers, certain aspects of the invention are also applicable to gas meters, electric meters, valves, and other types of utility equipment which may be located underground.

The foregoing detailed description is to be clearly understood as given by way of illustration and example only, the spirit and scope of this invention being limited solely by the appended claims.

I claim:

1. An enclosure for underground utility equipment, which comprises:
    a. a hole liner disposed in the ground,
        said hole liner having an open upper end,
        said hole liner enclosing utility equipment, and
    b. a cover having an upper wall and having a depending skirt which extends downwardly from said upper wall,
        the inner diameter of said skirt being greater than the outer diameter of said upper end of said hole liner,
        said skirt being telescoped downwardly around said upper end of said hole liner to prevent entrance of earth into said hole liner,
        said upper wall of said cover being spaced above said upper end of said hole liner,
        said skirt and thus said cover being supported by the earth at regions around said upper end of said hole liner,
        the support of said skirt and of said cover being independent of said hole liner.

2. The invention as claimed in claim 1, in which said upper wall of said cover is at or above grade level and has an opening therethrough, and in which a protective element is removably mounted over said opening, said protective element being removable without moving said skirt.

3. The invention as claimed in claim 1, in which said skirt has an outwardly-extending flange at the lower portion thereof, said flange resting on the earth to provide support for said cover, said flange being buried and thus serving as an anchor.

4. The invention as claimed in claim 1, in which both said cover and said hole liner are formed of fiberglass and synthetic bonding resin.

5. The invention as claimed in claim 4, in which said hole liner is cylindrical and has radially-outwardly extending flanges at the upper and lower ends thereof, in which said hole liner is formed of two semicylindrical sections each having outwardly-extending flanges at each side edge thereof, and in which means are provided to secure said last-mentioned flanges to each other.

6. The invention as claimed in claim 1, in which said utility equipment is an underground transformer, in which said upper wall of said cover has an opening therethrough, and in which a protective element is removably mounted over said opening, said protective element being removable without moving said skirt, said protective element being adapted to permit passage of air therethrough for cooling of said transformer.

7. An enclosure for underground transformers, which comprises:
    a. a hole liner adapted to be buried in the ground in vertical relationship,
        said hole liner having an open upper end,
        said hole liner being adapted to have an electrical utility transformer mounted therein,
    b. an exposed cover having an upper wall adapted to be positioned over said upper end of said hole liner to prevent entrance of earth and of undesired objects into said hole liner, said upper wall of said cover being spaced above said upper end of said hole liner and
        said cover having opening means therethrough adapted to permit upward convection of cooling air from said transformer to the ambient atmosphere, and
    c. conduit means adapted to be mounted in dependent relationship on said cover and to extend downwardly therefrom to the space within said hole liner,
        said conduit means permitting downward convection of cooling air therethrough from the ambient atmosphere and to the vicinity of said transformer,
        said air then convecting upwardly and passing outwardly through opening means in said cover.

8. The invention as claimed in claim 7, in which said conduit means comprise a substantial number of tubes mounted in dependent relationship from said cover, and extending downwardly to the lower end of said hole liner.

9. The invention as claimed in claim 8, in which an air-transmissive element is mounted over said cover, said element covering both said opening means and the upper ends of said tubes.

10. The invention as claimed in claim 9, in which said cover is formed of fiberglass and synthetic bonding resin, in which said opening means comprises an opening through the central region of said cover, in which portions of said cover around said opening are recessed downwardly in order to seat said air-transmissive element, and in which said tubes extend through said depressed portions of said cover and on opposite side portions of said opening.

11. The invention as claimed in claim 7, in which a protective element is mounted in dependent relationship from said cover and generally parallel to said cover, said protective element being spaced beneath said opening means in said cover.

12. The invention as claimed in claim 7, in which said conduit means comprises a substantial number of electrically nonconductive tubes mounted in dependent relationship from said cover, in which an air-transmissive grid is mounted over said cover and covers both said opening means and the upper ends of said tubes, in which said cover is formed of fiberglass and synthetic bonding resin, in which said opening means comprises a large opening through the central region of said cover, in which portions of said cover around said large opening are recessed downwardly in order to seat said grid, and in which said tubes extend through said recessed portions of said cover and on opposite side portions of said large opening.

13. The invention as claimed in claim 12, in which an air-transmissive protective element is mounted in dependent relationship from said cover and generally parallel thereto, said protective element being spaced a substantial distance beneath said large opening in said cover, said protective element being supported by hangers which, in turn, are suspended from hanger supports bridged across said large opening.

14. An enclosure for underground transformers, which comprises:
a. a hole liner buried in the ground in vertical relationship,
said hole liner having an open upper end which is below grade level,
said hole liner having an electrical utility transformer mounted therein,
b. a cover having an upper wall and having a depending skirt which extends downwardly from said upper wall,
the inner diameter of said skirt being greater than the outer diameter of said upper end of said hole liner,
said skirt being telescoped downwardly around said upper end of said hole liner to prevent entrance of earth into said hole liner,
said upper wall of said cover being spaced above said upper end of said hole liner,
said skirt and thus said cover being supported by the earth at regions around said upper end of said hole liner, the support of said skirt and of said cover being independent of said hole liner,
said upper wall of said cover being at or above grade level and being exposed to view, and
c. means to effect convective circulation of air from the ambient atmosphere down to the lower regions of said hole liner around said transformer to thereby effect cooling of said transformer,
said circulation means comprising an opening in said cover adapted to permit upward convection of air from the vicinity of said transformer,
said circulation means further comprising a plurality of conduits mounted in dependent relationship from said cover,
the upper ends of said conduits communicating with the ambient atmosphere,
the lower ends of said conduits communicating with said hole liner at regions spaced around the lower end of said transformer.

15. The invention as claimed in claim 14, in which said cover and said hole liner are formed of fiberglass and synthetic bonding resin.

16. An enclosure for underground utility equipment, which comprises:
a. a vertical hole liner formed of fiberglass and synthetic bonding resin, and having an open upper end,
said hole liner being buried in the earth and with said upper end spaced below grade level,
b. a cover formed of fiberglass and synthetic bonding resin, and having an upper wall and a depending skirt the inner diameter of which is greater than the outer diameter of said upper end of said hole liner,
said skirt being telescoped downwardly over said upper end of said hole liner and with said upper wall of said cover spaced above said upper end of said hole liner,
said skirt having an outwardly-extending flange at the lower end thereof and seated on the earth around said hole liner,
said outwardly-extending flange on said skirt forming the sole support for said cover whereby said cover is supported independently of said hole liner and may be adjusted independently thereof, and
c. a mass of material mounted around said skirt and above said flange at the lower end thereof and serving as a weight and support to maintain said cover against upward shifting,
said mass of material being removable in order to permit shifting of said cover when desired in order to compensate for factors including change of grade.

17. The invention as claimed in claim 16, in which an electrical utility transformer is mounted in said hole liner, and in which means are provided to effect convective circulation of air through said cover and down into said hole liner to thereby air in cooling said transformer.

18. The invention as claimed in claim 17, in which said convective circulation means includes a large opening in the central region of said upper wall of said cover, and further includes a substantial number of vertical tubes extending through said upper wall of cover and downwardly into the lower portion of said hole liner in spaced relationship around the lower end of said transformer, said tubes permitting downward convection of air to the lower end of said hole liner and said central opening permitting upward convection of air from said hole liner.

19. The invention as claimed in claim 18, in which a protective louver is mounted in said cover in spaced relationship below said upper wall thereof, and in which a grid is removably secured to said upper wall of said cover over said opening therethrough and over the upper ends of said tubes.

20. The invention as claimed in claim 16, in which said hole liner is formed of two semicylindrical sections secured to each other, and in which said hole liner has outwardly-extending flanges at the upper and lower ends thereof.

21. A method of providing an enclosure for an underground utility service element, which comprises:
 a. providing a hole liner adapted to be mounted in the earth in vertical relationship,
 b. excavating a hole in the earth having a depth substantially greater than the vertical dimension of said hole liner, and having a diameter larger than the diameter of said hole liner,
 c. mounting said hole liner in said hole in vertical relationship and with the upper end of said hole liner spaced below the level of the grade around said hole,
 d. backfilling earth into said hole around said hole liner and to such a depth that the upper surface of the backfilled earth is spaced below the upper end of said hole liner,
 e. providing a cover element having an upper wall and having a depending skirt the inner diameter of which is larger than the diameter of the upper end of said hole liner,
 f. mounting said cover over said hole liner in telescoped relationship and with the lower portion of said skirt seated on the upper portion of the backfilled earth,
 g. correlating the elevation of the upper surface of said backfilled earth with the vertical dimension of said skirt and with the distance that the upper end of said hole liner is spaced below grade level, in such manner that said upper wall of said cover is spaced above said upper end of said hole liner and is flush with or somewhat above grade level, and
 h. backfilling material around said skirt and up to grade level whereby to maintain said cover in position and provide a decorative end product,
 whereby said cover may subsequently be raised or lowered to compensate for changes in grade level, by removing said cover and changing the level of the upper end of said backfilled earth.

22. The invention as claimed in claim 21, in which said method further comprises employing a cover having an outwardly-extending flange at the lower region of said skirt, and effecting said backfilling of said last-mentioned material above said flange.

23. The invention as claimed in claim 21, in which said method further comprises employing a hole liner having an open lower end, and providing gravel at the bottom of said hole in order to adjust the vertical position of said hole liner and in order to aid in effecting drainage of water from said hole liner.

24. A method of providing an enclosure for an underground utility service element, which comprises:
 a. providing a hole liner adapted to be mounted in the earth in vertical relationship,
 b. excavating a hole in the earth having a diameter larger than the diameter of said hole liner,
 c. mounting said hole liner in said hole in vertical relationship,
 d. backfilling earth into said hole around said hole liner and to such a depth that the upper surface of the backfilled earth is spaced below the upper end of said hole liner,
 e. providing a cover element having an upper wall and having a depending skirt the inner diameter of which is larger than the diameter of the upper end of said hole liner,
 f. mounting said cover over said hole liner in telescoped relationship and with the lower portion of said skirt seated on the upper portion of the backfilled earth,
 g. correlating the elevation of the upper surface of said backfilled earth with the vertical dimension of said skirt in such manner that said upper wall of said cover is flush with or somewhat above grade level, and
 h. backfilling material around said skirt whereby to maintain said cover in position and provide a decorative end product,
 whereby said cover may subsequently be adjusted to compensate for changes in grade level, by removing said cover and changing the level of the upper end of said backfilled earth.

* * * * *